(12) United States Patent
Grumann

(10) Patent No.: US 8,978,049 B2
(45) Date of Patent: Mar. 10, 2015

(54) SYSTEM AND METHOD FOR REALTIME DETECTION OF PROCESS DISRUPTIONS IN EVENT-DRIVEN ARCHITECTURES

(75) Inventor: Martin Grumann, Schwetzingen (DE)

(73) Assignee: Software AG, Darmstadt (DE)

( * ) Notice: Subject to any disclaimer, the term of this patent is extended or adjusted under 35 U.S.C. 154(b) by 169 days.

(21) Appl. No.: 13/545,474

(22) Filed: Jul. 10, 2012

(65) Prior Publication Data

US 2013/0339984 A1    Dec. 19, 2013

(30) Foreign Application Priority Data

Jun. 18, 2012    (EP) ..................... 12172403

(51) Int. Cl.
    *G06F 9/54*     (2006.01)
    *H04L 1/00*    (2006.01)
(52) U.S. Cl.
    USPC .......................................... 719/318; 709/231
(58) Field of Classification Search
    None
    See application file for complete search history.

(56) References Cited

U.S. PATENT DOCUMENTS

| | | | |
|---|---|---|---|
| 2005/0034017 A1* | 2/2005 | Airaud et al. | 714/25 |
| 2007/0219941 A1 | 9/2007 | Schnurr et al. | |
| 2008/0071595 A1* | 3/2008 | Chang et al. | 705/7 |
| 2012/0005220 A1* | 1/2012 | Schindlauer et al. | 707/769 |
| 2012/0323941 A1* | 12/2012 | Chkodrov et al. | 707/756 |

FOREIGN PATENT DOCUMENTS

EP    2 275 954    1/2011

OTHER PUBLICATIONS

J. Sousa et al ( "A distributed real-time system for event-driven control and dynamic data acquisition on a fusion plasma experiment", Elsevier, Fusion Engineering and Design, 2000, p. 31-36.*
Kresimir Vidackovic et al., "A Methodology for Dynamic Service Compositions Based on an Event-Driven Approach," 2011 Annual SRII Global Conference, Mar. 29, 2011.
Oracle Business Activity Monitoring (Oracle BAM), http://www.oracle.com/technetwork/middleware/bam/overview/index.html; Retrieved Jul. 6, 2012, 2 pages.
Tibco Business Activity Monitoring Software, http://www/tibco.com.br/software/business-activity-monitoring/default.jsp, Retrieved Jul. 6, 2012, 1 page.
IBM Websphere MQ, http://www-01.ibm.com/software/integration/wmq/; Retrieved Jul. 6, 2012, 1 page.

(Continued)

*Primary Examiner* — Charles E Anya
*Assistant Examiner* — Abdou Seye
(74) *Attorney, Agent, or Firm* — Nixon & Vanderhye PC

(57) ABSTRACT

Certain example embodiments relate to a system for realtime detection of process execution disruptions in an event-driven architecture. A plurality of event-driven applications each execute at least one process step to participate in the execution of a process. The system includes an event bus usable by the plurality of event-driven applications to communicate events among each other. The event bus comprises a control channel, the control channel being configured to receive at least one start event and at least one stop event from the plurality of event-driven applications. The start and stop events indicate the execution of a corresponding process step. The system further includes a Complex Event Processing (CEP) engine configured to analyze the start and stop events on the control channel to detect a disruption of the process.

19 Claims, 3 Drawing Sheets

(56) References Cited

OTHER PUBLICATIONS

Figure 1:
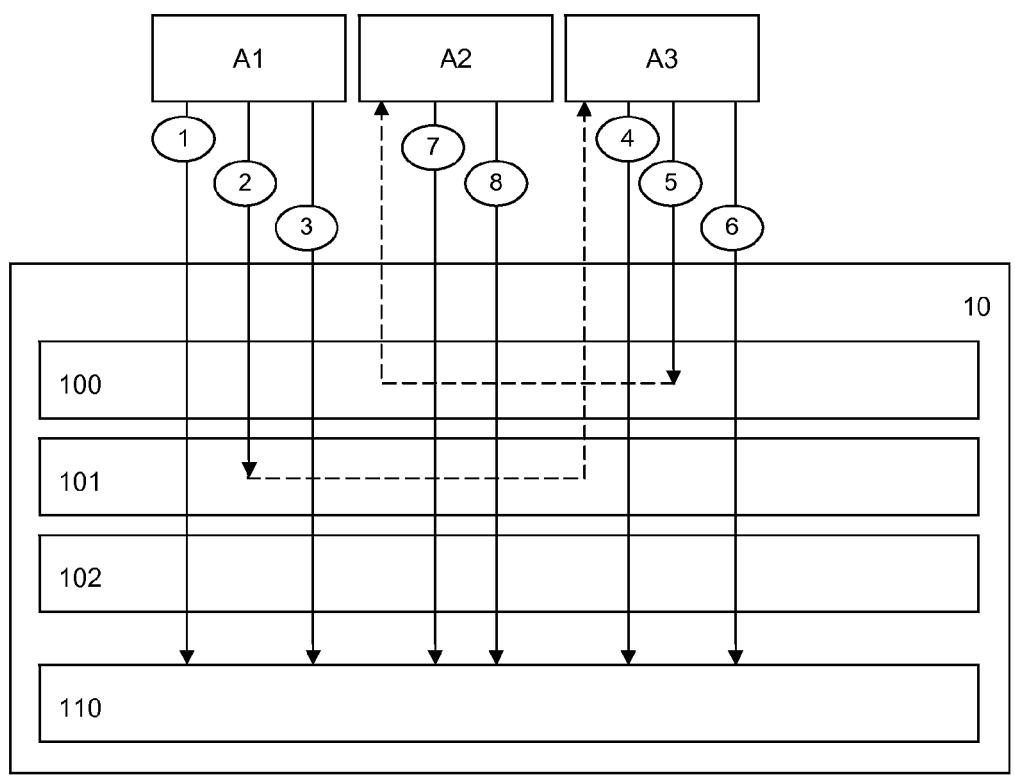

Oracle 9i Application Developer's Guide—Advanced Queuing Release 2, http://download.oracle.com/cd/B1050001_appdev.920/a96587/qintro.htm; Retrieved Jul. 6, 2012, 20 pages.

BAM, Business Activity Monitoring Solutions for Software AG http:www.softwareaeg.com/corporate/products/wm/bam/, Retrieved Jul. 6, 2012, 2 pages.

Web Methods Broker, http://www.softwareag.com/corporate/products/wm/application_integration/broker/overview/default/asp; Jul. 6, 2012, 2 pages.

* cited by examiner

SYSTEM AND METHOD FOR REALTIME DETECTION OF PROCESS DISRUPTIONS IN EVENT-DRIVEN ARCHITECTURES

This application claims priority to EP 12 172 403.3 filed 18 Jun. 2012, the entire contents of which is hereby incorporated by reference.

1. TECHNICAL FIELD

Certain example embodiments relate to a system and method for realtime detection of process disruptions in event-driven architectures.

2. BACKGROUND AND SUMMARY

Today, many modern computing systems are based on event-driven architectures (EDA). In an event-driven architecture, several computer applications each execute on distinct computer systems and are typically interconnected by a network, such as a local area network or even the Internet. Each application is in charge of executing a certain processing task, which represents a processing step in an overall process. Examples include the calculation of complex mathematical models (e.g. for weather forecasts or scientific computations) by a plurality of distributed computers, or the control of an assembly line e.g. for the manufacturing of a vehicle, wherein each assembly step is controlled by a particular application participating in the overall assembly process.

In order for the individual applications to communicate with each other (e.g. to notify the next application that it can now start processing the next process step, or to exchange intermediate results between the applications), event-driven architectures employ a common notification infrastructure (so-called "event bus"), which serves as a central communication backbone. Event producers (i.e. applications producing events as a result of their processing) advertise (i.e. select) a specific channel on the event bus, which is used later on to publish events. An event consumer (i.e. an application in need of a certain event in order for it to be able to conduct its own processing) subscribes for those channels it wants to receive events on. A main characteristic of such architectures is that the producer(s) and consumer(s) do not have to know each other; the communication is decoupled chronologically, territorially and regarding the synchronism. Due to the loose coupling between the interacting applications, event-driven architectures are said to be easier to change and extend simply by replacing and adding applications, respectively, thereby changing the overall process being executed. Enterprise systems based on the concept of event-driven architecture typically are more adaptive regarding external needs than systems that follow e.g. the peer-to-peer model.

On the other hand, the loose-coupling of applications and the high system dynamics in event-driven architectures raise several difficult questions, e.g. how to ensure that mission critical processes are correctly handled in real-time. In other words, it is desired to reliably detect process execution disruptions, such as an out-of-sequence execution of a certain process step, or a timeout of a process step, a step transition or the entire process. It goes without saying that such a detection technique should allow to detect process disruptions in real-time, i.e. as soon as possible while the process is actually executing. This realtime detection is an essential prerequisite for preventing that a currently executing process malfunctions, which may have a fatal impact on the underlying system. For example, if a disruption during execution of an assembly process of a vehicle is not detected in a timely manner, both the vehicles to be produced and the assembly line machinery may be severely harmed or even destroyed.

In the context of monitoring computer-aided processes, so-called Business Activity Monitoring (BAM) products are known. Whereas first generation BAM products were limited to processes running within one single BPM (Business Process Management) system, second generation products explicitly include processes that span over several event-driven applications. Exemplary products include Oracle Business Activity Monitoring (Oracle BAM), Tibco), or webMethods of applicant. Further, Messaging Infrastructure Systems are known, which allow applications to be distributed over heterogeneous platforms and which attempt to reduce the complexity of developing applications that span multiple operating systems and network protocols. In asynchronous systems, message queues provide temporary storage when the destination program is busy or not connected. Examples include IBM Websphere MQ, Oracle Advanced Queuing, or webMethods Broker of applicant.

The above-mentioned messaging systems provide for a guaranteed message delivery, i.e. in case a subscriber for a channel is not available in the moment an event is published, the event is kept within the messaging system as long as it could be delivered to the subscriber. However, the reliable delivery of event messages does not say anything about whether a process indeed meets the expected cycle time. For example, the successful receipt of an event does not mean that the event is instantly processed by the consumer. Furthermore, messaging systems typically do not provide for the notion of a (business) process. Specifically, the do not provide for means to correlate events published on different channels belonging to one and the same overall processing task.

Also, current BAM products attempt to provide real-time detection of business process errors in distributed environments based on the event-driven architecture. However, one severe drawback of these products is that they cannot distinguish between different error reasons. Rather, such systems just detect that a certain rule (e.g. a key performance indicator, KPI) is not met and react in the same way, independent of the original reason of the error.

Further, in order for most conventional BAM products to operate properly, these products need an exact definition of the overall process to be executed (i.e. a definition of the individual process steps, their sequence and the transitions between the steps). However, in highly dynamic and distributed systems, such as event-driven applications, a global process definition is seldom available.

It is therefore the technical problem underlying certain example embodiments to provide an improved system and method for the detection of process execution disruptions in event-driven architectures, thereby at least partly overcoming the above explained disadvantages of the prior art.

This problem is according to one aspect of the invention solved by a system for realtime detection of process execution disruptions in an event-driven architecture, wherein a plurality of event-driven applications each execute at least one process step to participate in the execution of a process. In the embodiment of claim 1, the system comprises:

a. an event bus, usable by the plurality of event-driven applications to communicate events among each other;

b. wherein the event bus comprises a control channel, the control channel being adapted for receiving at least one start event and at least one stop event from the plurality of event-driven applications, wherein the start and stop events indicate the execution of a corresponding process step;

wherein the system further comprises:

c. a Complex Event Processing (CEP) engine, adapted for analyzing the start and stop events on the control channel to detect a disruption of the process.

Accordingly, this embodiment allows to detect disruptions of a process that spans across multiple, distributed event-driven applications in realtime, i.e. while the process is currently executing. The system makes use of a Complex Event Processing (CEP) engine to analyse event streams for pattern matching. To this end, within the event bus commonly used by the event-driven applications in accordance to the publish-subscribe model, an additional control channel is defined. This additional control channel serves to record start and stop events, which are issued by the event-driven applications before and after they execute their respective processing tasks (steps). The CEP engine then analyzes the events published on the control channel to detect process execution disruptions. It is important to note that in difference to other technologies, the proposed system does not rely on the existence of a globally defined process model, but only uses the information obtained from the control channel. Furthermore, the system makes use of non-permanent events that occur on the event bus, i.e. it does not need any persistent data, which would otherwise have to be stored and kept on some storage medium.

In one aspect of the present invention detecting a disruption of the process comprises detecting that process steps are not executed in a predetermined order, detecting that the execution time of a process step exceeds a predefined threshold, detecting that the execution time of a process step transition exceeds a predefined threshold and/or detecting that the execution time of the process exceeds a predefined threshold.

Preferably, an event on the control channel (i.e. any start event and stop event published on the control channel) comprises a process identifier, a process instance identifier, a process step identifier and/or a type, the type indicating whether the event is a start event or a stop event.

In a preferred embodiment of the present invention, the CEP engine executes at least one continuous query on the events on the control channel to detect a disruption of the process. To this end, the at least one continuous query may evaluate the sequence of start events on the control channel to determine whether the process steps are executed in a predetermined order. Additionally or alternatively, the at least one continuous query may comprise a predefined process step threshold and may evaluate whether a start event on the control channel is followed by a corresponding stop event before expiration of the threshold. Furthermore, the at least one continuous query may comprise a predefined process step transition threshold and may evaluate whether a stop event on the control channel relating to a first process step is followed by a start event relating to the succeeding process step before expiration of the threshold. Lastly, the at least one continuous query may also comprise a predefined process threshold and may evaluate whether a stop event on the control channel occurs relating to the last step of the process before expiration of the threshold. It should be noted that the present invention is not limited to the above-defined continuous queries, and that one or multiple of the above evaluations may be conducted by the same continuous query.

Preferably, the at least one continuous query takes into account a process instance identifier defined in the start and stop events to correlate events relating to the same process instance. Accordingly, the process instance identifier enables the system to detect which events belong to the same process instance. Otherwise, it would not be possible to meaningfully analyze the events on the control channel, since events from multiple different process instances could not be differentiated.

Certain example embodiments also provide a method for realtime detection of process execution disruptions in an event-driven architecture, wherein a plurality of event-driven applications each execute at least one process step to participate in the execution of a process, wherein the method comprises the steps of receiving, on a control channel of an event bus, at least one start event and at least one stop event from the plurality of event-driven applications, wherein the start and stop events indicate the execution of a corresponding process step and analyzing, by a Complex Event Processing (CEP) engine, the start and stop events on the control channel to detect a disruption of the process. Further advantageous modifications of embodiments of the method of the invention are defined in further dependent claims.

Lastly, a computer program is provided, the computer program comprising instructions for implementing any of the above-described methods.

3. SHORT DESCRIPTION OF THE DRAWINGS

Figure 2:
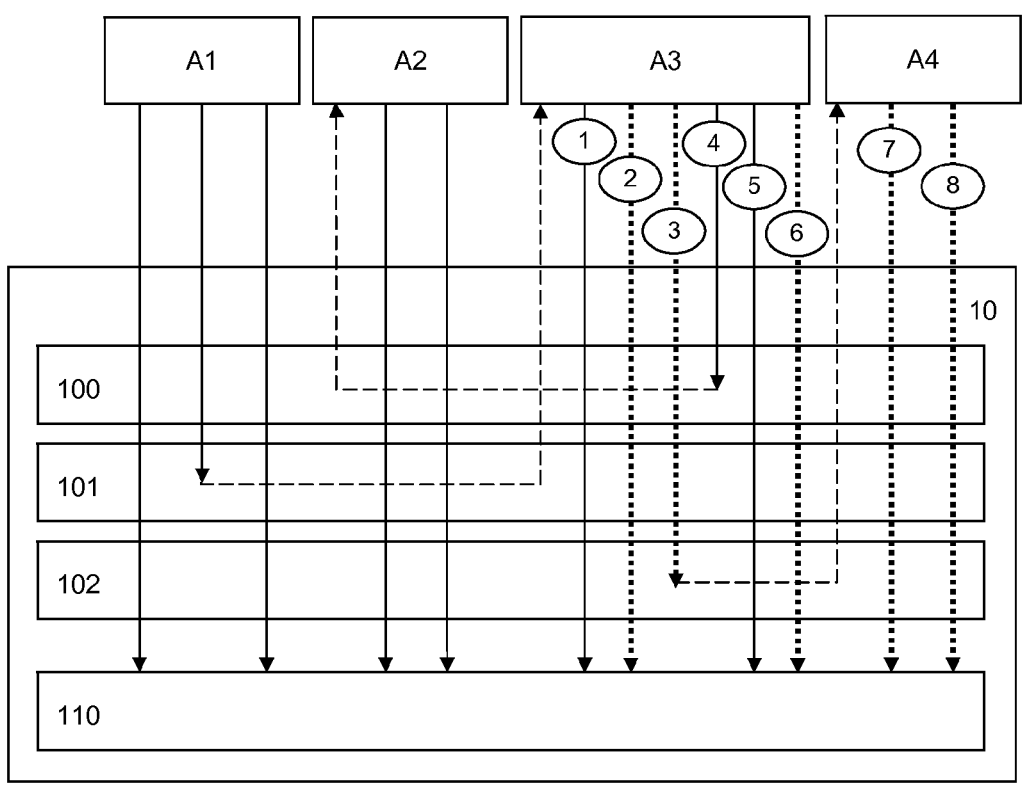

In the following detailed description, presently preferred embodiments of the invention are further described with reference to the following figures:

FIG. 1: A schematic view of three exemplary applications executing a process instance using an event bus in accordance with an embodiment of the present invention;

FIG. 2: A schematic view of four exemplary applications executing two process instances using an event bus in accordance with an embodiment of the present invention; and FIG. 3: A schematic view of a system comprising an event bus and a CEP engine in accordance with an embodiment of the present invention.

4. DETAILED DESCRIPTION

In the following, a presently preferred embodiment of the invention is described with respect to an event-driven architecture (EDA) as schematically shown in FIG. 1. As can be seen, the exemplary EDA comprises three event-driven applications A1, A2 and A3. Each application A1, A2, A3 is in charge of executing a certain processing task, wherein the processing tasks constitute the process steps of an overall process. More specifically, the example of FIG. 1 is based on a process in which application A1 executes the first process step, followed by application A3 executing the second process step, and application A2 executing the third and final process step. It should be noted that the example of FIG. 1 is extremely simplified and that the present invention is applicable to any type of EDA comprising any number of applications.

As it is known in the prior art, the applications A1, A2 and A3 use a so-called event bus 10 as a central communication backbone. The event bus 10 comprises channels 100, 101, 102 which are used by the applications to publish events, while other applications subscribe to certain channels in order to get informed when an event of interest occurs (the general publish-subscribe model was as already described further above).

Certain example embodiments enhance this known architecture, as will be explained in the following:

Start and Stop Notifications

In addition to the "ordinary" channels which bear the primary events communicated between the applications A1, A2, A3, the event bus 10 comprises in accordance with embodiments of the present invention an additional control channel no (also referred to as "meta-data channel" hereinafter).

The control channel 110 is usable by the applications A1, A2, A3, i.e. by any participant of the event-driven architecture (producer or consumer), to announce the processing of a processing step by means of a start and end notification. In other words, an event on a (primary) event channel 100, 101, 102 is preferably always encapsulated by a preceding start event and a succeeding stop event on the control channel no. To this end, the control channel no is preferably a dedicated channel, i.e. it hosts only start and stop events. Similarly, a processing step performed by one of the applications A1, A2, A3 is also encapsulated by respective start and stop events if the application does not produce an event on a (primary) event channel 100, 101, 102.

With reference to the example of FIG. 1, application A1 is advertising channel 101, for which application A3 is subscribing for. Application A3, in turn, is advertising channel 100, for which application A2 is subscribing for. Application A1 (typically in response to an external stimulus) publishes an event on channel 101 (see the arrow labelled "2" in FIG. 1). But before doing so, application A1 publishes a start event on the control channel 110 (arrow "1"). At the end of the processing, application A1 publishes a stop event (arrow "3") on the control channel no. The event bus 10 delivers the event on channel 101 to application A3 (since application A3 subscribed to events published on channel 101; see the dashed arrow in FIG. 1). Application A3 indicates the start (arrow "4") and the end (arrow "6") of processing on the control channel no and publishes another event on channel 100 in-between (arrow "5"). The event published on channel 100 is routed to application A2 (see the dashed arrow). After receiving the event on channel 100, application A2 indicates the start of its processing by means of a start event on the control channel no (arrow "7"), and the stop of processing by a stop event (arrow "8"), but does itself not emit a new event on the primary channels 100, 101 or 102.

Figure 3:
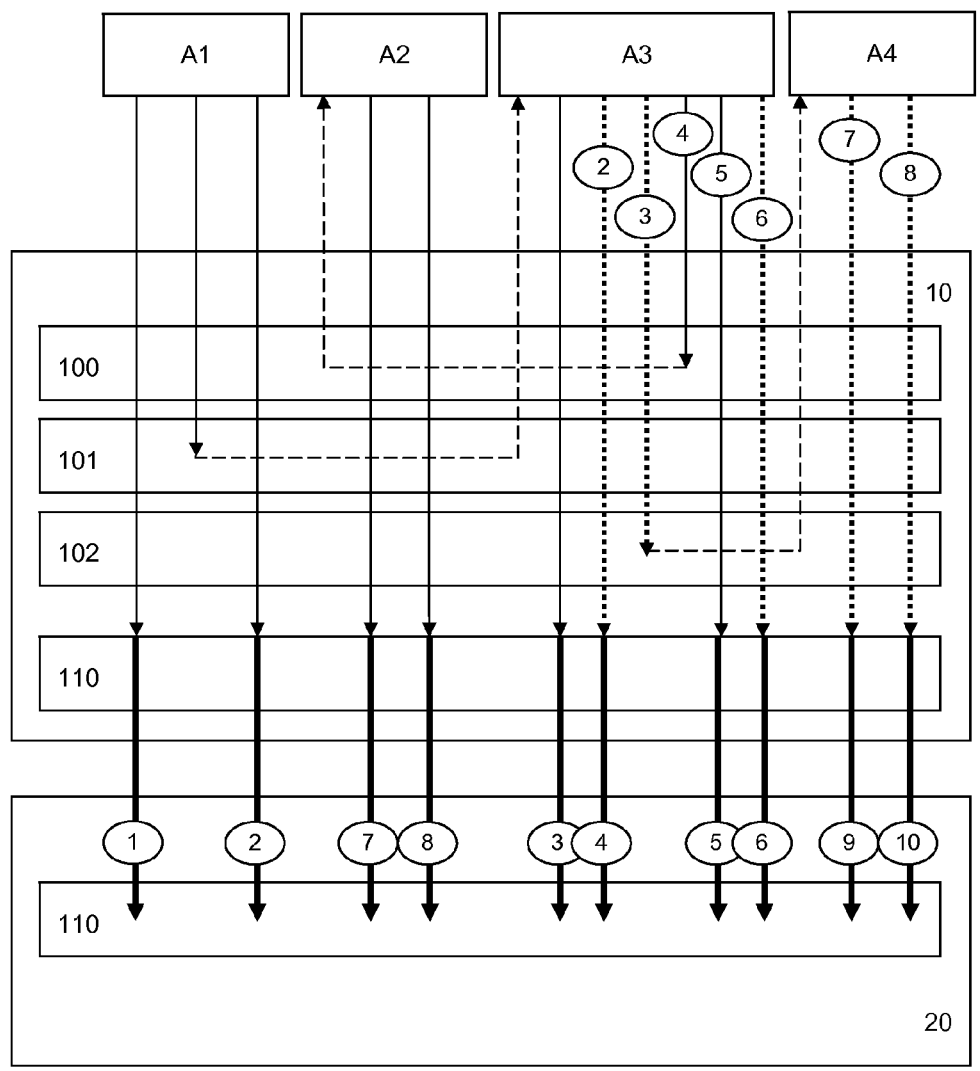

In a preferred embodiment, all events published on the control channel 110 have the same format, regardless to which process and process instance (see below) they refer. The following table describes the preferred tuple schema:

| Name | Data type | Comment |
|---|---|---|
| processId | String | Identifies the process that is executed. Set by the application which starts the process (i.e. which published the first event). The value of "processId" is the name and/or Id of the channel the initial (first) event is published on.<br>This implies that different processes are not started by events on the same channel (As can be seen in FIGS. 2 and 3 described in more detail further below, application A3 starts a second process by publishing an event on channel 102, while the first process was started on channel 101). |
| instanceId | String | Universal unique identifier for the process instance (see "process instance identifier" below). |
| stepId | String | Identifies the processing step that has been either started or finished. Set by the application application in charge of the processing step. The value of "stepId" is the name and/or Id of the channel on which the application will publish an event for this |

-continued

| Name | Data type | Comment |
|---|---|---|
| | | process instance. If the application does itself not issue an event on a primary channel, the value stays initial and/or is left blank. Since no further process steps will follow in such a case for the given process instance, the value is still unique. |
| type | String | Either "Start" or "Stop" |

Note that there is preferably no explicit timestamp defined in the events, since each event implicitly provides for a timestamp of its appearance on the event bus 10.

Process Instance Identifier

Typically the participants in an event-driven architecture execute multiple different processes at the same time. For example, the applications A1, A2 and A3 may execute one process instance as described above, while application A3 executes another process instance together with a further application A4. In order to correlate events published on the primary channels 100, 101, 102 and the control channel 110 in a meaningful manner, the events thus have to be correlated with the respective process instance to which they belong. In this context, the person skilled in the art will appreciate that the term "process instance" refers to a particular execution (i.e. instance) of a given process, wherein a particular process might be executed multiple times in multiple instances.

Therefore, in embodiments of the present invention, the events comprise an identifier (also referred to as "process instance identifier") that uniquely identifies the respective process instance. The process instance identifier is preferably generated by the application A1, A2, A3 which is starting a new process. In order for the process instance identifiers to be unique, different algorithms known in the art may be employed, such as Leach-Salz, which generate globally sufficient unique IDs.

This scenario is depicted in FIG. 2. As can be seen, applications A1, A2 and A3 execute the process instance already described above, wherein among others application A3 sends out the start notification on the control channel 110 (arrow "1" in FIG. 2), triggered by receiving an event published on channel 101. This start event (arrow "1") specifically contains the same process identifier as the event received from channel 101 in order to indicate that the start event belongs to the same process instance than the event received on channel 101. Afterwards, application A3 publishes an event on channel 100 (arrow "4" in FIG. 2).

In addition, application A3 also starts a new process instance. To this end, application A3 generates a new process instance identifier and uses it within the start/stop notifications (arrows "2" and "6"; the dotted arrows serve to distinguish this process instance from that represented by the dashed arrows) as well as in the event published on channel 102 (arrow "3"). As mentioned above, application A4 has subscribed to channel 102 and uses the process instance identifier included in the received event for its further processing, i.e. for the start and stop events (arrows "7" and "8").

Pattern Matching

In order to monitor process execution disruptions, embodiments of the present invention employ complex event processing (CEP). Within the scope of the present invention, a process execution disruption is the situation in which:

(1) Process steps are not executed in the correct order,
(2) The execution time of a single process step exceeds a certain threshold, (3) The execution time of a process step transition (i.e. the time span between two consecutive process steps) exceeds a certain threshold, and/or (4) The execution time of the overall process execution (i.e. the time span between the start of the first process step and the end of the last process step) exceeds a certain threshold.

Embodiments of the present invention employ a CEP engine (cf. the CEP engine 20 shown in FIG. 3) to analyse the event streams received on the control channel 110 for pattern matching in real-time, which allows to detect any of the above-defined types of process execution disruptions.

To this end, the CEP engine uses a number of continuous queries for recognizing relevant patterns in the observed event streams:

The correct ordering of processing steps (disruption type (1) mentioned above) is checked by a continuous query that recognizes the sequence of start notifications on the control no channel for a given process instance.

Per participating application A1, A2, A3, A4, a second continuous query checks the absence of a stop notification within a certain period of time after having received a start notification for a given process instance (disruption type (2)). This mechanism is also called non-event detection. Using non-event detection, the violation (i.e. the process execution disruption) can be identified already in the moment the threshold is exceeded and does not rely on the arrival of the delayed stop notification (if arriving at all). This is why certain example embodiments of the present invention provide realtime detection of process execution disruptions, i.e. the disruptions are detected as soon as possible during the actual execution of the process.

Per process step transition, a third continuous query checks the absence of a succeeding start notification after having received a stop of the preceding step (disruption type (3)).

Finally, a fourth continuous query checks the absence of the stop notification of last step within a certain period of time after having received the start notification of the first step (disruption type (4)).

In the following, examples for the above-defined continuous queries are provided:

Detection of Out-of-Sequence Execution of Process Steps (Disruption Type (1))

In order to detect an out-of-sequence step execution, the start events published on the control channel 110 are evaluated by the CEP engine 20 by means of a continuous query. The continuous query is preferably executed on each new event occurring on the control channel 110. The basic idea is to identify an out-of-sequence step execution using a pattern matcher that is based on the fact that the process step start notifications are sorted in ascending order regarding the step identifier.

Generally speaking, the field of Complex Event Processing (CEP) and of Continuous Queries has to date not agreed on a standardized format and language for formulating continuous queries. Rather, all conventional CEP engines use proprietary syntax. The Continuous Query Language (CQL) is an example of a query language developed specifically for continuous queries, however, it is to date not used much. The exemplary queries shown herein are formulated in the query language used by the CEP engine of applicant, which is quite intuitive for the person skilled in the art. Examples of conventional CEP engines supporting declarative query languages are Software AG Business Events, Streambase CEP, Oracle CEP, Esper and Tibco Business Events.

The following exemplary continuous query returns the process step identifier of a process instance where the pattern "ab*c" is matched, wherein "a" represents the start event of the first process step, "b" represents a subsequent start event that arrives in the expected sequence, and finally "c" represents a start event which is out-of-sequence. The pattern matcher will produce a result in the case "a" took place, followed zero, one or multiple "b", followed by one occurrence of "c".

```
SELECT vProcessId, vInstanceId, vStepId
FROM meta_channel
MATCHING
(
  MEASURES
    vProcessId STRING,
    vInstanceId String,
    vStepId Integer
  PATTERN 'ab*c'
  DEFINE a AS type = 'start' AND
           UDF_computePos(processId, stepId) = 1
         DO vProcessId = processId,
            vInstanceId = instanceId,
            vStepId = 1
       b AS type = 'start' AND
           instanceId = vInstanceId AND
           UDF_computePos(processId, stepId) =
(vStepId+1)
         DO
           vStepId = vStepId+1
       c AS type = 'start' AND
           instanceId = vInstanceId AND
           UDF_computePos(processId, stepId) !=
(vStepId+1)
         DO
           vStepId = UDF_computePos(processId, stepId)
);
```

The query shown above uses a user-defined function "computePos" to compute the expected position of the given process step. The following shows an exemplary implementation of this function. Additionally, a second user-defined function "computeNumberOfSteps" is defined that is used in "Process timeout detection" (cf. disruption type 4 further below).

```
package map;
import java.util.HashMap;
import java.util.Map;
import
com.softwareag.wep.resource.udf.UserDefinedFunctionProperties;
import
com.softwareag.wep.resource.udf.UserDefinedFunctions;
/*
 * UDFs can be accessed in SQL statements in two ways
 * 1. the annotation has a name (function alias) specified:
 *    prefix "UDF_" + annotation name, e.g.
 UDF_functionAlias
 * 2. the annotation has no name specified:
 *    prefix "UDF_" + fully qualified method name with dots
 *    substituted by underlines
 *    e.g. UDF_org_demo_company_SampleUDF_sampleFunction
 *
 * A UDF can have multiple input values and must have one
 * output value. The following list of value types is
 * currently supported:
 * Integer, Double, Float, Long, Boolean, Byte, Short,
 * Big_Decimal, String
 */
public class ProcessStepPositionMapper extends
UserDefinedFunctions
{
    /** Enumeration of processes with step id to step
position mapping */
    public enum PROCESS
    {
        @SuppressWarnings("serial")
        /** Represents the first process shown in Fig.
```

```
2*/
        P1("101", new HashMap<String, Integer> ( )
        {
            {
                put ("101", 1); // A1
                put ("100", 2); // A3
                put ("", 3);    // A2 leaves this
blank as it does not publish an event except the ones on
the meta-channel
            };
        }),
        @SuppressWarnings("serial")
        /** Represents the second process shown in Fig.
2*/
        P2("102", new HashMap<String, Integer>( )
        {
            {
                put ("102", 1); // A3
                put ("", 2);    // A4
            };
        });
    String processId;
    Map<String, Integer> stepPositionMap;
    PROCESS (String processId, Map<String, Integer>
stepPositionMap)
    {
        this.processId = processId;
        this.stepPositionMap = stepPositionMap;
    }
    /** @return the expected position of the step
     */
    public Integer computePos(String stepId)
    {
        return stepPositionMap.get(stepId);
    }
    /** @return the number of steps of this process
     */
    public Integer computeNumberOfSteps( )
    {
        return stepPositionMap.size( ) ;
    }
    /**
     * @param processId the identifier of the
process
     * @return process object that holds
information about the process
     */
    public static PROCESS getProcess (String
processId)
    {
        if (P1.equals(processId))
        {
            return P1;
        }
        if (P2.equals(processId))
        {
            return P2;
        }
        return null;
    }
}
/**
 * computes the position of the given step in the
given process
 * @param processId the identifier of the process
 * @param stepId the identifier of the process step
 * @return the expected position of the given process
step
 */
@UserDefinedFunctionProperties (name = "computePos")
public static Integer computePos (final String
processId, final String stepId)
{
    PROCESS process =
PROCESS.getProcess (processId);
    return process.computePos (stepId);
}
/**
 * computes the number of steps for a given process
 * @param processId the identifier of the process
 * @param stepId the identifier of the process step
 * @return number of process steps
 */
@UserDefinedFunctionProperties (name =
"computeNumberOfSteps")
public static Integer computeNumberOfSteps (final
String processId)
{
    PROCESS process =
PROCESS.getProcess (processId);
    return process.computeNumberOfSteps ( );
}
}
```

A concrete example: As already explained further above, FIG. 1 shows the execution of a process whose steps are executed by the applications A1, A2 and A3. A1 is processing the initial step and is publishing an event on channel 101. A3 is executing step 2 and is publishing a new event on channel 100. Subsequently, A2 is executing the 3rd (and final) step. The query evaluates the event sequence on the meta channel 110 as follows: The first start notification (arrow "1" in FIG. 1) with step identifier "101" is mapped to an "a". The subsequent start notification (4) with step identifier "100" is mapped to a "b". The final start notification (7) with blank step identifier maps to "b", too. The query will recognize the sequence "abb" which does not match the pattern "ab*c". In other words, since the pattern which the continuous query looks for has not occurred, no error is raised and the process execution is deemed to be correct.

Now, let us assume that for whatever reasons the start notification (4) of A3 does not arrive and thus the event sequence on channel 100 is (1), (7). Once again, the continuous query maps (1) to an "a". The value of the matcher variable "vStepId" is now 1. For the subsequent start notification (7) the query computes the expected position 3. As the current value of the matcher variable "vStepId" plus one does not equal the expected position 3, the query maps (7) to a "c". As the sequence "ac" is matching the pattern "ab*c" the continuous query in this case generates an output event immediately and the out-of-sequence execution of process steps is thus detected.

Process Step Timeout Detection (Disruption Type (2))

In order to detect that the execution of a single process step exceeds a maximum time threshold, the start and stop notifications/events on the control channel 110 are evaluated by a continuous query. The basic idea is to identify a start notification for a given process instance that is not followed by stop notification within a certain timeframe. Note that the described detection logic works also when the expected stop notification does not arrive at all.

The exemplary continuous query shown below defines the pattern "ab*", wherein "a" stands for the occurrence of a step start notification. In this case the process instance identifier given in the start event is stored into matcher variables vInstanceId. "b" is defined to be either again a start notification, or a stop notification of another process instance, or a stop notification of the same process instance but other process step. The pattern matcher will produce a result after 5 minutes in the case "a" took place, followed zero, one or multiple "b". In the case that the expected stop notification arrives within 5 minutes, the pattern "ab*" cannot be fulfilled anymore, as this event does not match the conditions for a "b". The following continuous query creates a complex-event containing the identifier of the process instance which execution of step "7" takes longer than 5 minutes:

```
SELECT vInstanceId
FROM meta_channel
MATCHING
(
  MEASURES
    vinstanceId String
  PATTERN 'ab*'
  DURATION 5 MINUTE
  DEFINE a AS type = 'start' AND
           processId = '100' AND
           UDF_computePos(processId, stepId) = 7
         DO vinstanceId = instanceId
       b AS type = 'start' OR
           instanceId != vInstanceId OR
           (instanceId = vInstanceId AND
UDF_computePos(processId, stepId) != 7)
);
```

Process Step Transition Timeout Detection (Disruption Type (3))

In order to detect that a transition in-between two process steps exceeds a certain time limit, it is checked if the stop notification of the preceding step is followed by a start notification of the succeeding step. Note that the described detection logic works also when the expected start notification does not arrive at all. The following exemplary continuous query creates a complex-event containing the process step identifier where the next step did not start within 10 minutes:

```
SELECT vInstanceId, vStepId
FROM meta_channel
MATCHING
(
  MEASURES
    vInstanceId String,
    vStepId Integer
  PATTERN 'ab*'
  DURATION 10 MINUTES
  DEFINE a AS type = 'stop' AND
           processId = '100'
         DO vInstanceId = instanceId,
           vStepId = UDF_computePos(processId, stepId)
       b AS type = 'stop' OR
           instanceId != vInstanceId OR
           (instanceId = vInstanceId AND
UDF_computePos(processId, stepId) != (vStepId+1))
);
```

Process Timeout Detection (Disruption Type (4))

In order to detect that the execution time of an overall process instance exceeds a time limit, it is checked if the start notification of the first step is followed by a corresponding stop notification of the last step (the last step can be determined by means of the user-defined function "computeNumberOfSteps" explained further above). This works very similar to the detection of process step timeouts (disruption type (2)). Note again that the described detection logic works also when the expected stop notification of last step does not arrive at all. The following exemplary continuous query fires a complex-event if an instance for process "100" is started but when the final step is not finished within 10 hours:

```
SELECT vInstanceId
FROM meta_channel
MATCHING
(
  MEASURES
    vInstanceId String
  PATTERN 'ab*'
  DURATION 10 HOURS
  DEFINE a AS type = 'start' AND
           processId = '100' AND
           UDF_computePos(processId, stepId) = 1
         DO vInstanceId = instanceId
       b AS type = 'start' OR
           instanceId != vInstanceId OR
           (instanceId = vInstanceId AND
UDF_computePos(processId, stepId) !=
UDF_computeNumberOfSteps(processId))
);
```

EXAMPLE

The following example illustrates the advantages of certain example embodiments over existing BAM products, which (as explained in the introductory portion) cannot distinguish between different error reasons. Assume there is a process "order processing" which starts by receiving customer orders. Assume there is the need to allocate different materials from the stock. An application, the so called "disposition", is in charge of allocating materials. This disposition application would subscribe for new incoming orders and would advertise a "scheduled orders" channel. While trying to allocate some material, the disposition application could experience that this material is actually out of stock. Accordingly, the step processing is blocked until the required renewal of stock has happened. If the average cycle time exceeds an upper limit, a conventional BAM product might trigger the increase of the reserve fund. Nevertheless, there could be other reasons that prevent the proper customer order processing. Assume the disposition application is not able to deal with the rate the customer orders are published on the event bus. The orders will be inserted into a queue either at the messaging system itself (if the application does not acknowledge with same rate) or at the disposition application (application still acknowledges with same rate but cannot process in that rate).

Secondly, the availability of that application might be simply too low. In this case, again the average cycle time for the disposition step might exceed an upper limit. Anyhow, the conventional BAM product would detect that the cycle time is not okay and would again increase the reserve fund. As this action was the right choice to reduce cycle time in the first case, it apparently is a misleading measure for the latter case.

SUMMARY

In summary, embodiments of the present invention rely on the concept of using a special control channel (meta-channel) of an event bus to record the sequence of start and stop notifications (start/stop events) for the processing of a step combined with CEP pattern matching using a CEP engine to overcome the problem of the prior art in detecting errors (e.g. out of sequence process operation) in real-time, where the (business) process is event stream based and spans multiple distributed event-driven applications.

Current business activity monitoring (BAM) products have problems in distinguishing between different errors, which can lead to the wrong action as a result of the detection. In modern day sophisticated message systems, there is the problem of correlating events published on different channels belonging to one (business) process. Certain example embodiments of the present invention provide a particularly elegant solution to these problems.

It will be appreciated that as used herein, the terms system, subsystem, service, module, program logic, programmed logic circuitry, engine, and the like may be implemented as any suitable combination of software, hardware, firmware, and/or the like. The systems described herein may include, for example, processing resources such as, for example, at least one processor and a memory, that may at least partially control software and/or other modules, etc. It also will be appreciated that the storage locations/repositories herein may be any suitable combination of disk drive devices, memory locations, solid state drives, CD-ROMs, DVDs, tape backups, storage area network (SAN) systems, and/or any other appropriate non-transitory tangible computer readable storage medium. For instance, data may be exported to a non-transitory computer readable storage medium. It also will be appreciated that the techniques described herein may be accomplished by having at least one processor execute instructions and/or applications that may be tangibly stored on a non-transitory computer readable storage medium. Similar statements apply with respect to clients, servers, and/or other elements in various network arrangements.

What is claimed is:

1. A system for realtime detection of process execution disruptions in an event-driven architecture, wherein a plurality of event-driven applications, in connection with respective processing resources including at least one processor, each execute at least one process step to participate in the execution of a process, wherein the system comprises:
   an event bus including one or more channels, the event bus being usable by the plurality of event-driven applications to communicate events among each other via the one or more channels;
   wherein the event bus comprises a dedicated control channel, that is distinct from the other channels of the event bus, the dedicated control channel being configured to receive at least one start event and at least one stop event from the plurality of event-driven applications, wherein the start and stop events indicate the execution of a corresponding process step;
   wherein the system further comprises: a Complex Event Processing (CEP) engine in communication with the dedicated control channel, the CEP engine being configured to execute at least one continuous query on the start and stop events on the dedicated control channel to detect a disruption of the process, the at least one continuous query comprising a predefined process step transition threshold, and
   wherein the CEP engine is further configured to evaluate whether a start event on the dedicated control channel is followed by a corresponding stop event before expiration of the threshold.

2. The system of claim 1, wherein detecting a disruption of the process comprises detecting that process steps are not executed in a predetermined order, detecting that the execution time of a process step exceeds a predefined threshold, detecting that the execution time of a process step transition exceeds a predefined threshold and/or detecting that the execution time of the process exceeds a predefined threshold.

3. The system of claim 1, wherein an event on the dedicated control channel comprises a process identifier, a process instance identifier, a process step identifier and/or a type, the type indicating whether the event is a start event or a stop event.

4. The system of claim 1, wherein the at least one continuous query evaluates the sequence of start events on the dedicated control channel to determine whether the process steps are executed in a predetermined order.

5. The system of claim 1, wherein the at least one continuous query takes into account a process instance identifier defined in the start and stop events to correlate events relating to the same process instance.

6. A system for realtime detection of process execution disruptions in an event-driven architecture, wherein a plurality of event-driven applications, in connection with respective processing resources including at least one processor, each execute at least one process step to participate in the execution of a process, wherein the system comprises:
   an event bus including one or more channels, the event bus being usable by the plurality of event-driven applications to communicate events among each other via the one or more channels;
   wherein the event bus comprises a dedicated control channel, that is distinct from the other channels of the event bus, the dedicated control channel being configured to receive at least one start event and at least one stop event from the plurality of event-driven applications, wherein the start and stop events indicate the execution of a corresponding process step;
   wherein the system further comprises: a Complex Event Processing (CEP) engine in communication with the dedicated control channel, the CEP engine being configured to execute at least one continuous query on the start and stop events on the dedicated control channel to detect a disruption of the process, the at least one continuous query comprising a predefined process step transition threshold, and
   wherein the CEP engine is further configured to evaluate whether a stop event on the dedicated control channel relating to a first process step is followed by a start event relating to the succeeding process step before expiration of the threshold.

7. The system of claim 6, wherein detecting a disruption of the process comprises detecting that process steps are not executed in a predetermined order, detecting that the execution time of a process step exceeds a predefined threshold, detecting that the execution time of a process step transition exceeds a predefined threshold, and/or detecting that the execution time of the process exceeds a predefined threshold.

8. The system of claim 6, wherein an event on the dedicated control channel comprises a process identifier, a process instance identifier, a process step identifier, and/or a type, the type indicating whether the event is a start event or a stop event.

9. A system for realtime detection of process execution disruptions in an event-driven architecture, wherein a plurality of event-driven applications, in connection with respective processing resources including at least one processor, each execute at least one process step to participate in the execution of a process, wherein the system comprises:
   an event bus including one or more channels, the event bus being usable by the plurality of event-driven applications to communicate events among each other via the one or more channels;
   wherein the event bus comprises a dedicated control channel, that is distinct from the other channels of the event bus, the dedicated control channel being configured to receive at least one start event and at least one stop event from the plurality of event-driven applications, wherein the start and stop events indicate the execution of a corresponding process step;
   wherein the system further comprises: a Complex Event Processing (CEP) engine in communication with the dedicated control channel, the CEP engine being configured to execute at least one continuous query on the start and stop events on the dedicated control channel to detect a disruption of the process, the at least one continuous query comprising a predefined process threshold, and wherein the CEP engine is further configured to evaluate whether a stop event on the dedicated control channel occurs relating to the last step of the process before expiration of the threshold.

10. The system of claim 9, wherein detecting a disruption of the process comprises detecting that process steps are not executed in a predetermined order, detecting that the execution time of a process step exceeds a predefined threshold, detecting that the execution time of a process step transition exceeds a predefined threshold, and/or detecting that the execution time of the process exceeds a predefined threshold.

11. The system of claim 9, wherein an event on the dedicated control channel comprises a process identifier, a process instance identifier, a process step identifier, and/or a type, the type indicating whether the event is a start event or a stop event.

12. A method for realtime detection of process execution disruptions in an event-driven architecture, wherein a plurality of event-driven applications each execute at least one process step to participate in the execution of a process, the method comprising:

receiving, on a dedicated control channel of an event bus including one or more additional channels usable by the plurality of event-driven applications to communicate events among each other via the one or more additional channels, at least one start event and at least one stop event from the plurality of event-driven applications, wherein the start and stop events indicate the execution of a corresponding process step, and wherein the dedicated control channel is distinct from the one or more additional channels of the event bus;

executing, in connection with a Complex Event Processing (CEP) engine in communication with the dedicated control channel and running on a computer system including at least one processor and a memory, at least one continuous query on the start and stop events on the dedicated control channel to detect a disruption of the process, wherein the at least one continuous query comprises a predefined process step threshold, the CEP engine evaluating whether a start event on the dedicated control channel is followed by a corresponding stop event before expiration of the threshold.

13. The method of claim 12, wherein an event on the dedicated control channel comprises a process identifier, a process instance identifier, a process step identifier and/or a type, the type indicating whether the event is a start event or a stop event.

14. The method of claim 12, wherein the at least one continuous query evaluates the sequence of start events on the dedicated control channel to determine whether the process steps are executed in a predetermined order.

15. The method of claim 12, wherein the at least one continuous query takes into account a process instance identifier defined in the start and stop events to correlate events relating to the same process instance.

16. A non-transitory computer readable storage medium tangibly storing a computer program comprising instructions for implementing real-time detection of process execution disruptions in an event-driven architecture, wherein a plurality of event-driven applications each execute at least one process step to participate in the execution of a process, the instructions being implemented to at least:

receive, on a dedicated control channel of an event bus including one or more channels usable by the plurality of event-driven applications to communicate events among each other via the one or more channels, at least one start event and at least one stop event from the plurality of event-driven applications, wherein the start and stop events indicate the execution of a corresponding process step and the dedicated control channel is distinct from the other channels of the event bus; and execute, in connection with a Complex Event Processing (CEP) engine in communication with the dedicated control channel and running on a computer system including at least one processor and a memory, at least one continuous query on the start and stop events on the dedicated control channel to detect a disruption of the process, wherein the at least one continuous query comprises a predefined process step threshold, and wherein the CEP engine is configured to evaluate whether a start event on the dedicated control channel is followed by a corresponding stop event before expiration of the threshold.

17. A system for realtime detection of process execution disruptions in an event-driven architecture, wherein a plurality of event-driven applications, in connection with respective processing resources including at least one processor, each execute at least one process step to participate in the execution of a process, wherein the system comprises:

an event bus usable by the plurality of event-driven applications to communicate events among each other via the event bus;

the event bus comprising a control channel configured to receive at least one start event and at least one stop event from the plurality of event-driven applications, wherein the start and stop events indicate the execution of a corresponding process step;

wherein the system further comprises: a Complex Event Processing (CEP) engine configured to analyze the start and stop events on the control channel and execute at least one continuous query to evaluate a sequence of the events on the control channel to detect a disruption of the process, wherein the at least one continuous query comprises at least one of:

a first predefined process step threshold and evaluates whether a start event on the control channel is followed by a corresponding stop event before expiration of the first threshold;

a second predefined process step transition threshold and evaluates whether a stop event on the control channel relating to a first process step is followed by a start event relating to the succeeding process step before expiration of the second threshold; and/or a third predefined process threshold and evaluates whether a stop event on the control channel occurs relating to the last step of the process before expiration of the third threshold.

18. The system of claim 17, wherein the continuous query is executed on each new event occurring on the control channel.

19. The system of claim 17, wherein the continuous query reads a process step identifier defined in the start event and the stop event to correlate events relating to the same process instance.

* * * * *